US011023569B2

(12) United States Patent
Eldefrawy et al.

(10) Patent No.: US 11,023,569 B2
(45) Date of Patent: Jun. 1, 2021

(54) SECURE RE-ENROLLMENT OF BIOMETRIC TEMPLATES USING FUNCTIONAL ENCRYPTION

(71) Applicant: SRI International, Menlo Park, CA (US)

(72) Inventors: Karim Eldefrawy, Palo Alto, CA (US); Tancrede Lepoint, Jersey City, NJ (US)

(73) Assignee: SRI International, Menlo Park, CA (US)

( * ) Notice: Subject to any disclaimer, the term of this patent is extended or adjusted under 35 U.S.C. 154(b) by 164 days.

(21) Appl. No.: 15/991,037

(22) Filed: May 29, 2018

(65) Prior Publication Data

US 2019/0370441 A1    Dec. 5, 2019

(51) Int. Cl.
*G06F 21/32* (2013.01)
*H04L 9/08* (2006.01)
*G06K 9/00* (2006.01)

(52) U.S. Cl.
CPC ......... *G06F 21/32* (2013.01); *G06K 9/00926* (2013.01); *H04L 9/0861* (2013.01); *H04L 9/0894* (2013.01)

(58) Field of Classification Search
CPC ... G06F 21/32; G06K 9/00926; H04L 9/0861; H04L 9/0894
See application file for complete search history.

(56) References Cited

U.S. PATENT DOCUMENTS

| 5,991,408 A | 11/1999 | Pearson et al. |
| 6,038,315 A | 3/2000 | Strait et al. |

(Continued)

FOREIGN PATENT DOCUMENTS

| JP | 2006270697 A | 10/2006 |
| JP | 2007148470 A | 6/2007 |

(Continued)

OTHER PUBLICATIONS

Goldreich., "General Cryptographic Protocols," Chapter 7, Foundations of Cryptography, vol. II Basic Applications, digitally printed version 2009, 449 pp. (Applicant points out, in accordance with MPEP 609.04(a), that the year of publication, 2009, is sufficiently earlier than the effective U.S. filing date, so that the particular month of publication is not in issue.).

(Continued)

*Primary Examiner* — Samson B Lemma
*Assistant Examiner* — Zoha Piyadehghibi Tafaghodi
(74) *Attorney, Agent, or Firm* — Shumaker & Sieffert, P.A.

(57) ABSTRACT

An example computing device includes a functional encryption unit configured to generate a master secret key and public key; apply functional encryption using the public key to biometric information of a user to produce functionally encrypted biometric information, the functional encryption is based on an encryption function that encodes the biometric information, a computation engine configured to perform re-enrollment by at least one of 1) retrieving a pre-generated function key from a memory, or 2) retrieving a dynamically generated function key from the one or more storage nodes that can be inaccessible during user authentication, the function key dynamically generated using the master secret key, and applying, using the function key and functionally encrypted biometric information, a decryption operation to generate new helper data, wherein the new helper data is generated as an evaluation of a cryptographic function during the decryption operation without the need to decrypt the biometric information.

20 Claims, 3 Drawing Sheets

(56) References Cited

U.S. PATENT DOCUMENTS

| | | | |
|---|---|---|---|
| 7,769,210 | B2 | 8/2010 | Ito |
| 10,142,333 | B1 | 11/2018 | Griffin et al. |
| 10,719,594 | B2 | 7/2020 | Eldefrawy |
| 2007/0118758 | A1 | 5/2007 | Takahashi et al. |
| 2007/0253608 | A1 | 11/2007 | Tulyakov et al. |
| 2008/0019573 | A1 | 1/2008 | Baltatu et al. |
| 2010/0066493 | A1 | 3/2010 | Rachlin |
| 2011/0264919 | A1* | 10/2011 | Pizano ............... H04L 63/0861 713/186 |
| 2012/0159600 | A1 | 6/2012 | Takagi |
| 2013/0225128 | A1* | 8/2013 | Gomar ................ G10L 17/22 455/411 |
| 2015/0095654 | A1 | 4/2015 | Li et al. |
| 2015/0278547 | A1 | 10/2015 | Kawamoto et al. |
| 2016/0337326 | A1* | 11/2016 | O'Hare .................. H04L 9/32 |
| 2018/0054436 | A1 | 2/2018 | Wagner |
| 2019/0138753 | A1 | 5/2019 | Wallrabenstein |
| 2019/0312731 | A1 | 10/2019 | Eldefrawy et al. |
| 2019/0327092 | A1* | 10/2019 | Kareti .................. H04L 9/0891 |

FOREIGN PATENT DOCUMENTS

| | | | |
|---|---|---|---|
| JP | 2007272775 | A | 10/2007 |
| JP | 2008502070 | A | 1/2008 |
| JP | 2012044670 | A | 3/2012 |
| JP | 2015194959 | A | 11/2015 |
| KR | 20110065139 | A | 6/2011 |
| WO | 2005122059 | A | 12/2005 |

OTHER PUBLICATIONS

Tulyakov et al., "Symmetric Hash Functions for Fingerprint Minutiae," Third International Conference on Advances in Pattern Recognition (ICAPR 2005), Aug. 22-25, 2005, 9 pp.

Uludag et al., "Securing Fingerprint Template: Fuzzy Vault with Helper Data," IEEE 2006 Conference on Computer Vision and Pattern Recognition Workshop (CVPRW'06), Jun. 17-22, 2006, 8 pp.

Baron et al., "How to Withstand Mobile Virus Attacks, Revisited," Proceedings of the 2014 ACM symposium on Principles of distributed computing, Jul. 15-18, 2014, 34 pp.

Ben-Or et al., "Completeness Theorems for Non-Cryptographic Fault-Tolerant Distributed Computation," Jan. 1988, 10 pp.

Peterson, "OPM Says 5.6 Million Fingerprints Stolen in Cyberattack, Five Times as Many as Previously Thought," Washington Post, Sep. 23, 2015, 2 pp.

"IOM Access2000," retrieved from https://www.princetonidentity.com, Jul. 11, 2018, 3 pp.

Eldefrawy et al., "System and Methods for Secure Re-Enrollment of Biometric Templates in a (Cryptographically) Secure Biometrics-Based Identification, Authentication and Access-Control System (BIAA) Using Functional Encryption (FE)," Computer Science Laboratory, SRI international, Apr. 14, 2017, 8 pp.

"Lagrange Polynomial," Wikipedia, the free encyclopedia, retrieved from https://en.wikipedia.org/wiki/Lagrange_polynomial, Jun. 29, 2018, 8 pp.

"Shamir's Secret Sharing," Wikipedia, the free encyclopedia, retrieved from https://en.wikipedia.org/wiki/Lagrange_polynomial, Jun. 29, 2018, 7 pp.

Shamir, "How to Share a Secret," Communications of the ACM, vol. 22, No. 11, Nov. 1979, pp. 612-613.

Hersberg et al., "Proactive Secret Sharing or: How to Cope with Perpetual Leakage," Advantages in Cryptology, CRYPTO '95, Jan. 1995, pp. 339-352.

Dolev et al., "Proactive Secret Sharing with a Dishonest Majority," Proceedings of the Security and Cryptography for Networks: 10th International Conference, Aug. 31-Sep. 2, 2016, 20 pp.

Maurer, "Secure Multi-Party Computation Made Simple," Discrete Applied Mathematics, vol. 154, No. 2, Feb. 1, 2006, pp. 370-381.

"Fuzzy Extractor," Wikipedia, the free encyclopedia, retrieved from https://en.wikipedia.org/wiki/Fuzzy_extractor, Jun. 29, 2018, 9 pp.

Dodis et al., "Fuzzy Extractors: How to Generate Strong Keys from Biometrics and Other Noisy Data," Advances in Cryptology—EUROCRYPT 2004. Lecture Notes in Computer Science, vol. 3027, Jan. 20, 2008, 47 pp.

Juels et al., "A Fuzzy Vault Scheme," Proceedings IEEE International Symposium on Information Theory, Jun. 30-Jul. 5, 2002, 18 pp.

U.S. Appl. No. 15/945,559, filed Apr. 4, 2018, naming inventors Eldefrawy et al.

Ohki et al., "Safety Countermeasures for Templates Using Fuzzy Biometric Valid Scheme," IPSJ SIG Technical Report, vol. 2005, No. 122, Dec. 9, 2005, 21 pp.

Satomura et al., "A Forgotten Secret Information Recovery Method and a Biometric Authentication Technique based on Fingerprints," IEICE Technical Report, The Institute of Electronics, Information and Communication Engineers, vol. 110, No. 443, Mar. 2011, 41 pages.

* cited by examiner

SECURE RE-ENROLLMENT OF BIOMETRIC TEMPLATES USING FUNCTIONAL ENCRYPTION

STATEMENT REGARDING FEDERALLY SPONSORED RESEARCH OR DEVELOPMENT

This invention was made with Government support under Contract No. HSHQDC-16-C-00034 awarded by the Department of Homeland Security. The Government has certain rights in this invention.

TECHNICAL FIELD

The disclosure relates to authentication systems and, more specifically, to re-enrollment of biometric information of authentication systems.

BACKGROUND

Authentication systems, e.g., Biometrics-based Identification, Authentication and Access control (BIAA) systems, process and analyze biometric information of a user to determine whether to provide the user with secure access and privileges to physical or virtual environments. During a user's initial use of these authentication systems, the authentication systems typically "enroll" (i.e., process and store) the user's biometric information. For example, authentication systems may process and store a template of the user's biometric sample (referred to as a "biometric template" or "Reference Biometric Template" (RBT)) that is a reference of the user's biometric information. The stored RBT is used to compare with a user's subsequent biometric sample to authenticate the user. However, in the case of a security breach, the RBT may be compromised and used to circumvent the authentication systems.

Some conventional authentication systems use cryptographic algorithms to generate so-called 'helper data,' which generally refers to information used to authenticate the user. In these conventional authentication systems, helper data is typically computed from the user's biometric information and is stored in place of RBTs to ensure that no information of the original biometric information is stored in the authentication system. In the event of a security breach or update, these conventional authentication systems need to collect additional or repeat biometric information of users to generate new helper data because the original biometric information is not stored. However, in installations or security domains with a large number of users, the collection of original or new biometrics for the users is a manual process that is cumbersome, or even impractical, process. Thus, there is a need for a more automated and efficient process for re-enrollment of biometric information from previously enrolled users.

SUMMARY

In general, this disclosure describes techniques for performing biometric re-enrollment using functional encryption. As described herein, the techniques enable re-enrollment and computation of new helper data for user authentication without having to re-acquire additional or repeat biometric information of the user. For example, during initial enrollment, a computing device collects and processes biometric information of the user and generates initial helper data for user authentication. After constructing the helper data, the computing device generates a master secret key and a public key, and stores the public key in one or more accessible storage nodes that are online during normal operation. The computing device applies functional encryption using the public key to the biometric information to produce functionally encrypted biometric information.

As described herein, the functional encryption techniques are based on an encryption function that encodes the biometric information. In the event of a security breach or update, instead of having to acquire additional or repeat biometric information for each of the users to generate new helper data, the computing device retrieves a function key from the temporarily-accessible storage nodes, which is brought back online, and applies, using the function key and the functionally encrypted biometric information, a decryption operation to generate new helper data for subsequent authentication of the user. Moreover, the new helper data is generated as an evaluation of a cryptographic function during the decryption operation without the need to decrypt the biometric information.

In this way, re-enrollment of users can be performed without having to reacquire additional or repeat biometric information from the users and without having to recover or otherwise reuse the original biometric at any centralized, potentially insecure node or device. As such, the techniques provide technical solutions that enable the secure automation or bulk re-enrollment of biometric information, thereby resulting in faster re-enrollment, especially for large security domains with large numbers of users.

In one example, this disclosure describes a method comprising: generating, by one or more computation engines of a biometric authentication system and according to biometric information of a user, helper data for authenticating the user. The method also comprises generating a master secret key and a public key, the public key stored in one or more storage nodes that are accessible during user authentication. The method further comprises applying functional encryption using the public key to the biometric information to produce functionally encrypted biometric information, wherein the functional encryption is based on an encryption function that encodes the biometric information. Additionally, the method comprises performing, by the computation engine, re-enrollment by at least one of 1) retrieving a pre-generated function key from a memory, or 2) retrieving a dynamically generated function key from the one or more storage nodes that can be inaccessible during user authentication, the function key dynamically generated using the master secret key, and applying, using the function key and the functionally encrypted biometric information, a decryption operation to generate new helper data for subsequent authentication of the user, wherein the new helper data is generated as an evaluation of a cryptographic function during the decryption operation without the need to decrypt the biometric information, wherein the re-enrollment occurs without receiving additional or repeat biometric information of a user and thereby results in faster re-enrollment.

In another example, this disclosure describes a computation device of a biometric authentication system comprising a functional encryption unit implemented in circuitry and configured to generate a master secret key and a public key. The functional encryption unit is also configured to apply functional encryption using the public key to biometric information to produce functionally encrypted biometric information, wherein the functional encryption is based on an encryption function that encodes the biometric information. The computation device also comprises a storage interface implemented in circuitry and configured to interface with one or more storage nodes for storing the public key in one or more storage nodes that are accessible during user authentication. The computation device further comprises a computation engine implemented in circuitry and configured to generate helper data for authenticating the user according to biometric information of the user; and perform re-enrollment, wherein, to perform re-enrollment, the functional encryption unit is configured to at least one of 1) retrieve a pre-generated function key from a memory, or 2) retrieve a dynamically generated function key form the one or more storage nodes that can be inaccessible during user authentication, the function key dynamically generated using the master secret key, and apply, using the function key and the functionally encrypted biometric information, a decryption operation to generate new helper data for subsequent authentication of the user, wherein the new helper data is generated as an evaluation of a cryptographic function during the decryption operation without the need to decrypt the biometric information, wherein the re-enrollment occurs without receiving additional or repeat biometric information of a user and thereby results in faster re-enrollment.

In another example, this disclosure describes a computer-readable storage medium of a biometric authentication system having stored thereon instructions that, when executed, cause a processor to generate helper data for authenticating a user according to biometric information of the user; generate a master secret key and a public key, the public key stored in one or more storage nodes that are accessible during user authentication; apply functional encryption using the public key to the biometric information to produce functionally encrypted biometric information, wherein the functional encryption is based on an encryption function that encodes the biometric information; and perform re-enrollment, wherein, to perform re-enrollment, the functional encryption unit is configured to at least one of 1) retrieve a pre-generated function key from a memory, or 2) retrieve a dynamically generated function key from the one or more storage nodes that can be inaccessible during user authentication, and apply, using the function key and the functionally encrypted biometric information, a decryption operation to generate new helper data for subsequent authentication of the user, wherein the new helper data is generated as an evaluation of a cryptographic function during the decryption operation without the need to decrypt the biometric information, wherein the re-enrollment occurs without receiving additional or repeat biometric information of a user and thereby results in faster re-enrollment.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
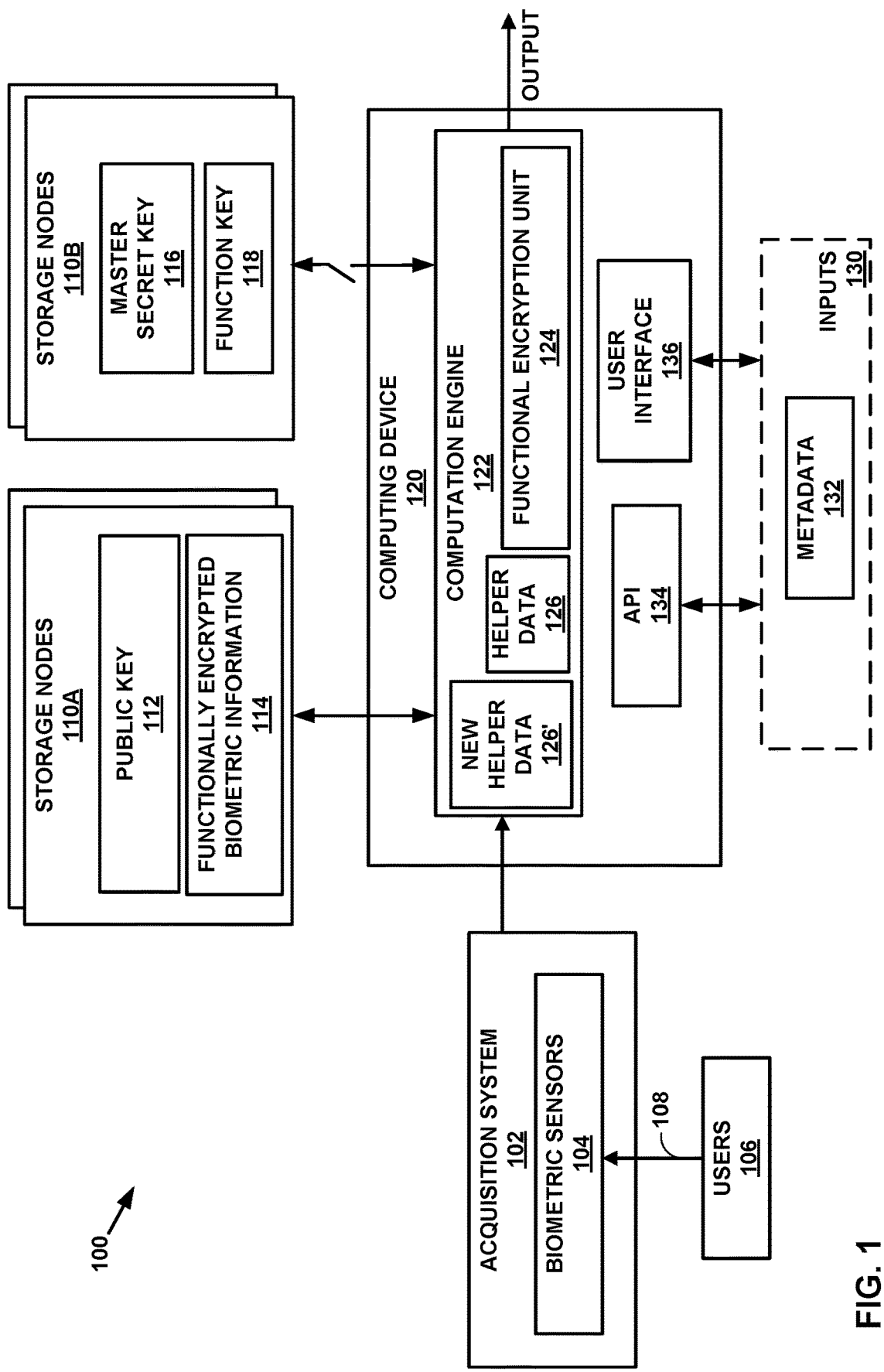
FIG. 1 illustrates an example biometric authentication system, in accordance with one or more aspects described in this disclosure.

FIG. 1 illustrates an example biometric authentication system 100, in accordance with one or more aspects described in this disclosure. In this example configuration, biometric authentication system 100 comprises at least an acquisition system 102, a computation engine 122 executing on an execution environment provided by computing devices 120, and storage nodes 110A, 110B (collectively, "storage nodes 110").

Acquisition system 102 accepts input from one or more biometric sensors 104 to acquire biometric information for one or more users. For instance, acquisition system 102 may comprise one or more biometric sensors 104 that include, fingerprint scanners (capacitive or optical), palm scanners, facial recognition scanners, facial expression scanners, iris/retina scanners, infrared cameras, heart rate scanners, gait sensors (e.g., video or accelerometers), or other biometric sensors that read biometric information 108 from users 106. Biometric information may include a biometric sample that comprises an image of a fingerprint, an image of a palm print, an image of a face, an image of a retinal scan, an image of an iris, heart rate patterns, movement of limbs, binary code in the case of an iris or audio sample, or the like, or a combination of two or more of such elements. In some examples, the components of acquisition system 102, including biometric sensors 104, are included within one physical structure. In some examples, the biometric sensors 104, are in different physical structures.

In some examples, biometric sensors 104 may read biometric samples from users 106 seeking access and/or privileges to physical and/or virtual environments, e.g., a software application, a physical lock, or other type of secure storage or application. Acquisition system 102 may receive biometric samples (e.g., images of fingerprints) from biometric sensors 104 and send the biometric samples to computation engine 122 for processing and storage, as further described below.

Computation engine 122 may be implemented in circuitry on one or more physical computing devices 120. For example, computation engine 122 may be implemented using a cluster of one or more server devices, server blades, personal computers, mobile computing devices, and/or other types of computing devices. For clarity, computing devices 120 are omitted from the remaining figures. However, it should be understood that in the context of other figures, computation engines are implemented in circuitry on one or more physical computing devices. In some examples, acquisition system 102 has screens or monitors that computation engine 122 can use to control and/or configure the operations of computation engine 122.

Computation engine 122 may include an application programming interface 134 and user interface 136 to receive inputs 130 from an operator, such as metadata 132. Metadata 132 may comprise data about objects, machines, people, or other information acquired by acquisition system 102. User interface 136 may comprise a graphical user interface, a command line interface, or another type of user interface that receives indications of user input from a user. API 134 may comprise an interface through which a software application can interact with computation engine 122. For instance, a software application may use API 134 to enable computation engine 122 to get data.

Storage nodes 110 may represent local or remote storage units for storing computer-readable data. For example, storage nodes 110 may represent any or all of hard drives, flash drives, Universal Storage Bus (USB) devices, tape drives, hard drives, floppy disks, compact disks, removable storage devices, etc. that are physically coupled to computing device 109, as well as storage devices that are physically coupled to remote computing devices, such as server devices. Storage nodes 110 may each be implemented using one or more computing devices, such as Network Attached Storage (NAS) devices, Storage Area Network (SAN) devices, server devices, or other types of computing devices. Storage nodes 110 may store various types of data. For example, storage nodes 110 may store functionally encrypted biometric information 114, public key 112, master secret key 116, and function key 118, as described further below. Storage nodes 110 may also store inputs 130, outputs of computation engine 122, reference data, and other types of data.

In some examples, storage nodes 110 may comprise a distributed storage system. For example, storage nodes 110A may comprise an online storage system that is accessible during user authentication for storing public key 112 and functionally encrypted biometric information 114. Storage nodes 110B may comprise an offline storage system that is temporarily-accessible during re-enrollment for storing master secret key 116 and function key 118. That is, storage nodes 110B may be configured as accessible only on a needed basis (e.g., during re-enrollment). In some examples, one or more storage nodes 110B may be physically removed from the one or more physical computing devices 120 and connected only on a needed basis (e.g., during re-enrollment). In some examples, each of storage nodes 110 may be geographically dispersed storage nodes. Computing engine 122 may include a storage interface implemented in circuitry that is configured to interface with storage nodes 110. Although FIG. 1A is illustrated as storing public key 112 and functionally encrypted biometric information 114 in online storage nodes 110A and storing master secret key 116 and function key 118 in offline storage nodes 110B, public key 112, functionally encrypted biometric information 114, master secret key 116, and function key 118 may be stored in either storage nodes 110A or storage nodes 110B.

During a user's initial use of biometric authentication system 100, biometric authentication system 100 "enrolls" biometric information of the user. That is, biometric authentication system 100 collects and processes the biometric information to generate helper data 126 for each subsequent authentication of the respective user. For example, computation engine 122 may initially process biometric samples received from acquisition system 102 and determine indicia of the biometric information from the biometric samples. Indicia of biometric information may include minutiae points of a fingerprint, iris codes in the case of eye scans, or other points of granularity of a biometric sample. Computation engine 122 may compute a template (referred to herein as a "biometric template," "Reference Biometric Template" or "RBT") according to the indicia of biometric information. The RBT is a template that provides a reference of the points of granularity extracted from a biometric sample. For example, an RBT for a fingerprint scan may identify the coordinates and orientation of specific points (e.g., ridge endings, ridge bifurcations, short ridges, etc.) of a fingerprint. Computing engine 122 may receive an image of a fingerprint and divide the image into blocks. Each block includes a part of the image of the fingerprint. Computation engine 122 determines the coordinates of indicia of the fingerprint within in each block (in relation to other blocks) and an orientation of the indicia of the fingerprint (e.g., the direction of an underlying ridge or bifurcation).

In this example of FIG. 1, as noted above, centralized computing device 120 of biometric authentication system 100 generates respective helper data 126 for each user for subsequent authentication of the user. As one example, helper data 126 may comprise a random string that is information about the RBT that could be made public but does not reveal any significant information of the RBT. Biometric authentication system 100 utilizes helper data 126 for authentication of that user. For example, biometric authentication system 100 may use helper data with a subsequent biometric sample (e.g., a noisy version of the biometric sample) to reconstruct a digital key or identifier that provides access or privileges for the authenticated user.

In some examples, biometric authentication system 100 uses one or more cryptographic algorithms, including, but not limited to, fuzzy extractor algorithm or a fuzzy vault algorithm, to generate helper data 126. As one example, a fuzzy extractor algorithm comprises two functions: a "Generate" function and a "Regenerate" function (referred to herein as "cryptographic functions"). The Generate function is executed to generate a digital key (Key) and one or more public parameters (Pub), where w represents an input of a string of data from a biometric sample converted to an RBT or another suitable form, as shown below:

$$\text{Generate}(w) = (\text{Key}, \text{Pub}) \quad \text{Function 1}$$

In general, helper data 126 is obtained by binding or locking a digital key (e.g., a random cryptographic key) with the RBT. Following the generation of helper data, the helper data is stored in a readily-accessible storage area for subsequent authentication of users 106 (illustrated as "helper data 126" in FIG. 1), and the RBT is typically discarded to avoid storing biometric information in the online portion of the biometric authentication system. Although helper data 126 is illustrated as stored in a readily-accessible storage within computing device 120, helper data 126 may be stored in a readily-accessible storage external to computing device 120.

After generation of helper data 126, biometric authentication system 100 uses subsequent biometric samples to authenticate users 106. For example, biometric authentication system 100 uses helper data 126 generated during initial enrollment together with the subsequent images of biometric samples to reconstruct the digital key that provides access or privileges for the authenticated user. As one example, a Regenerate function is used to reconstruct digital key (Key') that is used for authenticating the user, where w' represents an input of a string of data from a subsequent biometric sample converted to an RBT or another suitable form and Pub is the public parameters generated during initial enrollment, as shown below:

$$\text{Key}' = \text{Regenerate}(\text{Pub}, w') \quad \text{Function 2}$$

In some examples, Key' is generated if the difference between the initial biometric sample and the subsequent biometric sample is within the defined threshold (d), which is a tunable parameter that defines an acceptable detection accuracy, as shown below:

$$\text{Key}' = \text{Key if } |w - w'| < d \quad \text{Function 3}$$

The value of the threshold may be chosen to improve or maximize the detection accuracy. In some examples, the threshold may be defined to maximize Genuine Accept Rate (GAR) and to minimize False Accept Rate (FAR). As one example, the user may subsequently provide a noisy version of a biometric sample in which the difference between the initial biometric sample and the subsequent noise version of the biometric sample is not within an acceptable detection accuracy threshold. As a result, Key' is not generated. If the difference between the initial biometric sample and the subsequent noisy version of the biometric sample is within an acceptable detection accuracy threshold, Key' is generated and the user is authenticated.

In the event of an update or security breach of biometric authentication system 100, helper data 126 generated during initial enrollment may be compromised. To generate new helper data, conventional authentication systems typically need to store and reuse the original biometric information, which puts the original biometric information at risk, or would need previously enrolled users (or compromised users) to provide additional or repeat biometric information. However, in large-scale systems, the re-enrollment process may require a large number of users to each manually provide additional or repeat biometric information, which is an inefficient and sometimes an impractical process.

In accordance with the techniques of this disclosure, computing device 120 coordinates biometric re-enrollment using functional encryption. As described herein, the techniques enable re-enrollment and computation of new helper data 126' for user authentication without having to recover or otherwise reuse the original biometric information at computing device 120 and without having to re-acquire additional or repeat biometric information. For example, during initial enrollment, computation engine 122 of computing device 120 collects and processes biometric information of the user and generates initial helper data 126 for user authentication. After constructing helper data 126, and prior to discarding the biometric information (e.g., RBT), functional encryption unit 124 of computation engine 122 functionally encrypts the biometric information, in some examples, stores the cryptographic function in one of storage nodes 110 or distributed among storage nodes 110.

In the example of FIG. 1, functional encryption unit 124 may generate a public key 112 ("pk") and a master secret key 116 ("msk"), as shown below:

$$\text{Setup}(\ )=(pk,msk) \qquad \text{Function 4}$$

Public key 112 may comprise randomized public information that is used to encrypt an RBT. For example, functional encryption unit 124 may functionally encrypt an RBT ("functionally encrypted biometric information 114") of a given user according to the public key 112 ("pk") using an encryption function, as shown below:

$$\text{Encrypt}(pk,RBT(w_k))=\text{functionally encrypted biometric information} \qquad \text{Function 5}$$

Master secret key 116 may comprise a digital key that is used, in part to generate a function key (otherwise referred to herein as "secret key") that is further used, in part, with the functionally encrypted biometric information 114 to compute new helper data during re-enrollment, as further described below. In some examples, computation engine 122 may store public key 112 in an accessible storage node, e.g., storage nodes 110A, and may store master secret key 116 in a temporarily-accessible storage node, e.g., storage nodes 110B. That is, storage nodes 110B may each be configured with temporary access (i.e., only during re-enrollment) and/or physically removed from physical computing device 120.

For example, during enrollment, computation engine 122 initially processes biometric information of a user to determine a representation of the biometric to be functionally encrypted. For example, an RBT for a fingerprint may include a set of minutiae points in which each minutiae point comprises coordinates (e.g., $X_n$ and $Y_n$) and an orientation (e.g., $O_n$) of ridge endings, ridge bifurcations, short ridges, etc, of an image of a fingerprint. That is, each minutiae point is defined by an X-coordinate of a specific point in the image of a fingerprint, a Y-coordinate of the specific point in the image of the fingerprint, and the orientation of the specific point in the image of the fingerprint. In this example, functional encryption unit 124 may use public parameters 112 to functionally encrypt a list of coordinates and orientations, e.g., $(X_1,Y_1,O_1)$, $(X_2,Y_2,O_2)$, ... $(X_n,Y_n,O_n)$, for each respective minutiae point. The functionally encrypted RBTs, e.g., functionally encrypted biometric information 114, may comprise random strings that represent the list of coordinates and orientations that are encrypted. Computation engine 105 may store the functionally encrypted biometric information 114 in temporarily-accessible storage nodes 110.

In the event of a security breach or update, instead of having to acquire additional or repeat biometric information for each of the users to generate new helper data, computing device 120 retrieves a function key, e.g., function key 118, and functionally encrypted biometric information 114 used to generate new helper data 126'. Function key 118 is a digital key used, in part, to generate new helper data 126'. Function key 118 may be associated with a cryptographic function comprising any function of a fuzzy extractor algorithm or a fuzzy vault algorithm, such as a Generate function (as described above). Functional encryption unit 124 may, for example, generate function key 118 in accordance with the master secret key 116 and a description of a cryptographic function ("A"), as shown below:

$$\text{KeyDer}(msk,A)=\text{Function Key}(A) \qquad \text{Function 6}$$

In some examples, functional encryption unit 124 may generate function key 118 during initial enrollment, or any time prior to re-enrollment, and store the function key (referred to herein as "pre-generated function key") in storage nodes 110B or memory. For example, storage nodes 110B may run the Setup algorithm described above to generate public key 112 and master secret key 116. Storage nodes 110B may generate one or more 'random parameters' (e.g., $r_1, \ldots r_N$), and using master secret key 116, runs the KeyDer algorithm described above to generate a function key, e.g., function key 118, and store function key 118 in one of storage nodes 110B. Storage nodes 110B may then be configured to be offline during user authentication. When performing re-enrollment, computation engine 122 may configure storage nodes 110B as online and retrieve the pre-generated function key 118 in storage nodes 110B, which is ultimately used to generate new helper data.

Alternatively, or additionally, function key 118 may be dynamically generated during re-enrollment. As part of the re-enrollment process, computing device 120 may coordinate the generation of function key 118. For example, storage nodes 110B may retrieve the master secret key 116 from storage nodes 110B, and using master secret key 116, computing device 120 runs the KeyDer algorithm described above to dynamically generate function key 118 during re-enrollment. In any event, computation engine 122 may retrieve function key 118 (either pre-generated or dynamically generated) from one or more temporarily-accessible storage nodes, such as storage nodes 110B, to generate new helper data 126'.

Computation engine 122 may generate new helper data 126' from the functionally encrypted biometric information 114, public key 112, and the function key 118. For example, computation engine 122 may retrieve public key 112 and functionally encrypted biometric information 114 from storage nodes 110A, and together with function key 118 from storage nodes 110B, apply a decryption operation to generate the new helper data 126'. For example, functional encryption unit 124 may apply a decryption operation to functionally encrypted biometric information 114, public parameters 112, and function key 118, as shown below:

Decrypt(pk,Function Key(*A*),functionally encrypted biometric information)=New Helper Data   Function 7

When the decryption operation is applied to the functionally encrypted biometric information 114 and the function key 118, the result of the decryption operation is an output of a cryptographic function A (e.g., Generate function of the fuzzy extractor algorithm) evaluated on the functionally encrypted biometric information. That is, new helper data 126' is generated as a result of the decryption operation without the need to decrypt the functionally encrypted biometric information 114.

In this way, if function key 118 is compromised, only the function (i.e., Generate function of the fuzzy extractor algorithm) is recovered, and not the biometric information itself. In this way, biometric authentication systems, such as biometric authentication system 100, may generate new helper data without receiving additional or repeat biometric information of a user and without having to recover or otherwise reuse the original biometric at any centralized, potentially insecure node or device, thereby providing technical solutions that enable faster and secure re-enrollment.

Figure 2:
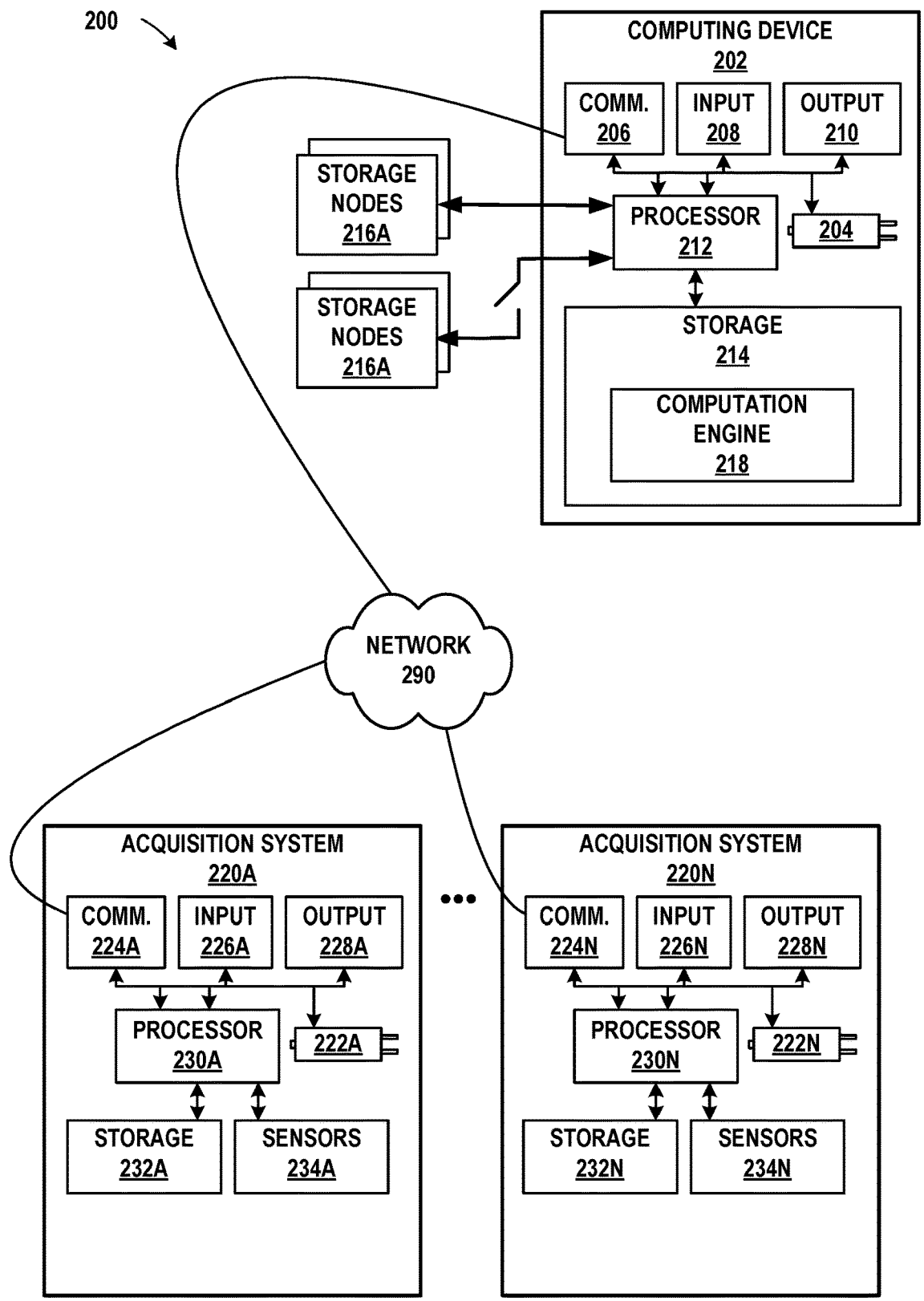
FIG. 2 is a block diagram illustrating an example authentication system that is configured in accordance with one or more aspects of the present disclosure.

FIG. 2 is a block diagram illustrating an example biometric authentication system 200 that is configured in accordance with one or more aspects of the present disclosure. Biometric authentication system 200 of FIG. 2 is described below as an example or alternate implementation of biometric authentication system 100 of FIG. 1. However, FIG. 2 illustrates only one particular example or alternate implementation of biometric authentication system 100, and many other example or alternate implementations of biometric authentication system 100 may be used or may be appropriate in other instances. Such implementations may include a subset of the components included in the example of FIG. 2 or may include additional components not shown in the example of FIG. 2. Computing device 202 may communicate with acquisition systems 220A through 220N (collectively, "acquisition systems 220") through a network 290.

Computing device 202 of FIG. 2 implements computation engine 122 and functional encryption unit 124 of FIG. 1. Computing device 202 includes power source 204, one or more communication units 206, one or more input devices 208, one or more output devices 210, one or more processors 212, one or more storage devices 214, and one or more storage nodes 216A, 216B (collectively, "storage nodes 216"). One or more storage devices 214 may include a computation engine 218. One or more of the devices, modules, storage areas, or other components of computing device 202 may be interconnected to enable inter-component communications (physically, communicatively, and/or operatively). In some examples, such connectivity may be provided through a system bus, a network connection, an inter-process communication data structure, or any other method for communicating data.

Power source 204 may provide power to one or more components of computing device 202. Power source 204 may receive power from the primary alternative current (AC) power supply in a building, home, business, or other location. In other examples, power source 204 may be a battery. In still further examples, computing device 202 and/or power source 204 may receive power from another source. Power source 204 may have intelligent power management or consumption capabilities, and such features may be controlled, accessed, or adjusted by one or more modules of computing device 202 and/or by one or more processors 212 to intelligently consume, allocate, supply, or otherwise manage power.

One or more input devices 208 of computing device 202 may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine.

One or more output devices 210 of computing device 202 may generate, receive, or process output. Examples of output are tactile, audio, visual, and/or video output. Output devices 210 may include a display, sound card, video graphics adapter card, speaker, presence-sensitive screen, one or more USB interfaces, video and/or audio output interfaces, or any other type of device capable of generating tactile, audio, video, or other output. Output devices 210 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 206 of computing device 202 may communicate with devices external to computing device 202 by transmitting and/or receiving data, and may operate, in some respects, as both an input device and an output device. In some examples, communication units 206 may communicate with other devices over a network. In other examples, communication units 206 may send and/or receive radio signals on a radio network such as a cellular radio network. In other examples, communication units 206 of computing device 202 may transmit and/or receive satellite signals on a satellite network such as a Global Positioning System (GPS) network. Examples of communication units 206 include a network interface card (e.g. such as an Ethernet card), an optical transceiver, a radio frequency transceiver, a GPS receiver, or any other type of device that can send and/or receive information. Other examples of communication units 206 may include Bluetooth®, GPS, 3G, 4G, LTE, and Wi-Fi® radios found in mobile devices as well as Universal Serial Bus (USB) controllers and the like. In accordance with aspects of this disclosure, communication units 206 may receive data, e.g., images of biometric samples, from acquisition systems 220.

One or more processors 212 of computing device 202 may implement functionality and/or execute instructions associated with computing device 202. Examples of processors 212 include microprocessors, application processors, display controllers, auxiliary processors, one or more sensor hubs, and any other hardware configured to function as a processor, a processing unit, or a processing device. Computing device 202 may use one or more processors 212 to perform operations in accordance with one or more aspects of the present disclosure using software, hardware, firmware, or a mixture of hardware, software, and firmware residing in and/or executing at computing device 202.

One or more storage devices 214 within computing device 202 may store information for processing during operation of computing device 202. In some examples, one or more storage devices 214 are temporary memories, meaning that a primary purpose of the one or more storage devices is not long-term storage. Storage devices 214 on computing device 202 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 214, in some examples, also include one or more computer-readable storage media. Storage devices 214 may be configured to store larger amounts of information than volatile memory. Storage devices 214 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 214 may store program instructions and/or data associated with one or more of the modules described in accordance with one or more aspects of this disclosure.

One or more processors 212 and one or more storage devices 214 may provide an operating environment or platform for one or one more modules, which may be implemented as software, but may in some examples include any combination of hardware, firmware, and software. One or more processors 212 may execute instructions and one or more storage devices 214 may store instructions and/or data of one or more modules. The combination of processors 212 and storage devices 214 may retrieve, store, and/or execute the instructions and/or data of one or more applications, modules, or software. Processors 212 and/or storage devices 214 may also be operably coupled to one or more other software and/or hardware components, including, but not limited to, one or more of the components illustrated in FIG. 2.

One or more modules illustrated in FIG. 2 as being included within storage devices 214 (or modules otherwise described herein) may perform operations described using software, hardware, firmware, or a mixture of hardware, software, and firmware residing in and/or executing at computing device 202. Computing device 202 may execute each of the module(s) with multiple processors or multiple devices. Computing device 202 may execute one or more of such modules as a virtual machine executing on underlying hardware. One or more of such modules may execute as one or more services of an operating system or computing platform. One or more of such modules may execute as one or more executable programs at an application layer of a computing platform.

Storage nodes 216 may store information such as a master key, public key, functionally encrypted biometric information, and a function key used to generate new helper data, in accordance with the techniques described herein. In some examples, storage nodes 216 may represent local or remote storage units for storing computer-readable data. For example, storage nodes 216 may represent any or all of hard drives, flash drives, Universal Storage Bus (USB) devices, tape drives, hard drives, floppy disks, compact disks, removable storage devices, etc. that are physically coupled to computing device 202. The combination of processors 212 and storage nodes 216 may function as a storage interface to retrieve, store, and/or execute the instructions and/or data of one or more applications, modules, or software. Processors 212 and/or storage nodes 216 may also be operably coupled to one or more other software and/or hardware components, including, but not limited to, one or more of the components illustrated in FIG. 2.

Computation engine 218 may generally perform tasks relating to computation engine 122 as described elsewhere in this disclosure. For example, execution of instructions associated with computation engine 218 may configure computing device 202 to receive biometric information from one or more acquisition systems 220. Execution of instructions associated with computation engine 218 may cause computing device 202 to generate helper data according to the biometric information of a user for authenticating the user. Moreover, execution of instructions associated with computation engine 218 may configure computing device 202 to generate a master secret key and a public key, the public key stored in one or more storage nodes 216A that are accessible during user authentication. Additionally, execution of instruction associated with computation engine 218 may configure computing device 202 to apply functional encryption using the public key to the biometric information to produce functionally encrypted biometric information, wherein the functional encryption is based on an encryption function that encodes the biometric information. Furthermore, execution of instructions associated with computation engine 218 may configure computing device 202 to store the master secret key to one or more storage nodes 216B that are inaccessible during user authentication. Execution of instructions associated with computation engine 218 may also configure computing device 202 to perform re-enrollment of the biometric information by: at least one of 1) retrieving a pre-generated function key from a memory, or 2) retrieving a dynamically generated function key from the one or more storage nodes that can be inaccessible during user authentication, the function key dynamically generated using the master secret key, and applying, using the function key and the functionally encrypted biometric information, a decryption operation to generate new helper data for subsequent authentication of the user, wherein the new helper data is generated as an evaluation of a cryptographic function during the decryption operation without the need to decrypt the biometric information, wherein the re-enrollment occurs without receiving additional or repeat biometric information of a user and thereby results in faster re-enrollment.

Computation engine module 218 may interact with and/or operate in conjunction with one or more modules of computing device 202. Computation engine 218 may receive biometric information and other inputs. Computation engine 218 may receive biometric information from communication units 206.

Acquisition system 220A of FIG. 2 may include power source 222A, one or more communication units 224A, one or more input devices 226A, one or more output devices 228A, one or more processors 230A, one or more storage devices 232A, and one or more sensors 234A. One or more of the devices, modules, storage areas, or other components of acquisition system 220A may be interconnected to enable inter-component communications (physically, communicatively, and/or operatively). In some examples, such connectivity may be provided by through system bus, a network connection, an inter-process communication data structure, or any other method for communicating data. Correspondingly, acquisition system 220N may include power source 222N, one or more communication units 224N, one or more input devices 226N, one or more output devices 228N, one or more processors 230N, one or more storage devices 232N, and one or more sensors 234N, which may include the same or similar capability, features, and/or functionality as similarly numbered components of acquisition system 220A. In some examples, and for certain acquisition systems 220, one or more components, devices, or modules shown in FIG. 2 as being included within one or more acquisition systems 220 may be optional.

Certain aspects of acquisition systems 220 are described below with respect to acquisition system 220A. Other acquisition systems 220 may be described similarly, and may also include the same, similar, or corresponding components, devices, modules, functionality, and/or other features. Descriptions herein with respect to acquisition system 220A may correspondingly apply to one or more other acquisition systems 220. In some examples, and as may be noted, one or more acquisition systems 220 may include more or fewer capabilities, features, components, and/or functionality than other acquisition systems 220.

Power source 222A may provide power to one or more components of acquisition system 220A. In some examples, power source 222A may be a battery. In other examples, power source 222A may receive power from the primary alternative current (AC) power supply in a building, home, or other location. In still further examples, acquisition system 220A and/or power source 222A may receive power from another source. Power source 222A may have intelligent power management or consumption capabilities, and may such features may be controlled, accessed, or adjusted by one or more modules of acquisition system 220A and/or by one or more processors 230A to intelligently consume, allocate, supply, or otherwise manage power.

One or more input devices 226A of acquisition system 220A may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine. One or more output devices 228A of acquisition system 220A may generate, receive, or process output. Examples of output are tactile, audio, visual, and/or video output. Output devices 228A may include a display, sound card, video graphics adapter card, speaker, presence-sensitive screen, one or more USB interfaces, video and/or audio output interfaces, or any other type of device capable of generating tactile, audio, video, or other output. Output devices 228A may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, acquisition system 220A may include a presence-sensitive display that may serve as a user interface device that operates both as one or more input devices 226A and one or more output devices 228A.

One or more communication units 224A of acquisition system 220A may communicate with devices external to acquisition system 220A by transmitting and/or receiving data, and may operate, in some respects, as both an input device and an output device. In some examples, communication unit 224A may communicate with other devices over a network 290. In other examples, communication units 224A may send and/or receive radio signals on a radio network such as a cellular radio network. In other examples, communication units 224A of acquisition system 220A may transmit and/or receive satellite signals on a satellite network such as a Global Positioning System (GPS) network. Examples of communication units 224A include a network interface card (e.g. such as an Ethernet card), an optical transceiver, a radio frequency transceiver, a GPS receiver, or any other type of device that can send and/or receive information. Other examples of communication units 224A may include Bluetooth®, GPS, 3G, 4G, LTE, and Wi-Fi® radios found in mobile devices as well as Universal Serial Bus (USB) controllers and the like.

One or more processors 230A of acquisition system 220A may implement functionality and/or execute instructions associated with acquisition system 220A. Examples of processors 230A include microprocessors, application processors, display controllers, auxiliary processors, one or more sensor hubs, and any other hardware configured to function as a processor, a processing unit, or a processing device. Acquisition system 220A may use one or more processors 230A to perform operations in accordance with one or more aspects of the present disclosure using software, hardware, firmware, or a mixture of hardware, software, and firmware residing in and/or executing at acquisition system 220A.

One or more storage devices 232A within acquisition system 220A may store information for processing during operation of acquisition system 220A. In some examples, one or more storage devices 232A are temporary memories, meaning that a primary purpose of the one or more storage devices is not long-term storage. Storage devices 232A on acquisition system 220A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 232A, in some examples, also include one or more computer-readable storage media. Storage devices 232A may be configured to store larger amounts of information than volatile memory. Storage devices 232A may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 232A may store program instructions and/or data associated with one or more of the modules described in accordance with one or more aspects of this disclosure.

One or more processors 230A and one or more storage devices 232A may provide an operating environment or platform for one or one more modules, which may be implemented as software, but may in some examples include any combination of hardware, firmware, and software. One or more processors 230A may execute instructions and one or more storage devices 232A may store instructions and/or data of one or more modules. The combination of processors 230A and storage devices 232A may retrieve, store, and/or execute the instructions and/or data of one or more applications, modules, or software. Processors 230A and/or storage devices 232A may also be operably coupled to one or more other software and/or hardware components, including, but not limited to, one or more of the components illustrated in FIG. 2.

Figure 3:
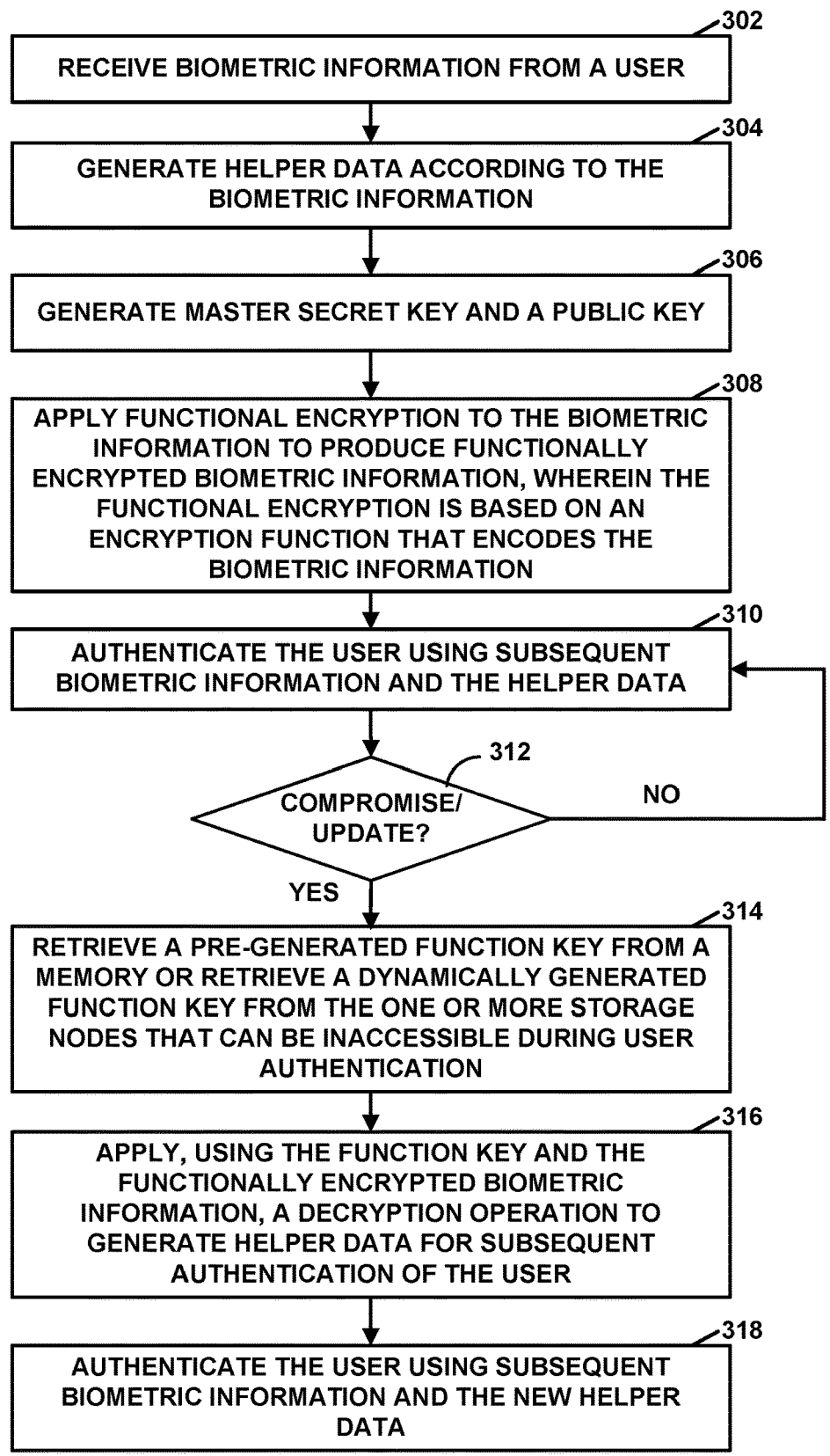
FIG. 3 is a flowchart illustrating an example operation of a computing device, in accordance with one or more aspects described in this disclosure.

FIG. 3 is a flowchart illustrating an example operation of the computing device, in accordance with the techniques of this disclosure. Although the method of FIG. 3 is described with respect to computing device 120 of FIG. 1, it should be understood that computing device 202 of FIG. 2 may also be configured to perform this or a similar method.

Computing device 120 receives biometric information from a user (302). For example, one of biometric sensors 104 reads a biometric sample from user 106. Acquisition system 102 receives the biometric information and sends the biometric information to computing device 120. Computation engine 122 of computing device 120 may construct a biometric template (e.g., reference biometric template) according to the biometric information. For example, in response to receiving an image of a fingerprint, computing engine 122 may divide the fingerprint image into blocks that each includes a part of the image of the fingerprint. Computation engine 122 determines the indicia of the fingerprint in each block (in relation to other blocks) and an orientation of the indicia of the fingerprint (e.g., the direction of an underlying ridge or bifurcation at a particular coordinate). Using these coordinates and orientation of the indicia of the fingerprint, computation engine 122 constructs a biometric template.

Computation engine 122 of computing device 120 may generate helper data according to the biometric information (304). For example, computing engine 122 may use cryptographic algorithms, e.g., fuzzy extractor algorithm, to generate helper data. The helper data is obtained by binding a key with the biometric template such that the helper data is used to reconstruct the key to authenticate a user.

Computation engine 122 of computing device 120 may generate master secret key 116 and a public key 112 (306). For example, computation engine 122 may generate the master secret key 116 and the public key 112 during initial enrollment. In some examples, the public key 112 is stored in one or more storage nodes that are accessible during user authentication. In some examples, the master secret key 116 is stored in one or more storage nodes that are inaccessible during user authentication.

Computation engine 122, via functional encryption unit 124, may apply functional encryption using the public key to the biometric information to produce functionally encrypted biometric information, wherein the functional encryption is based on an encryption function that encodes the biometric information (308). For example, functional encryption unit 124 may generate public key 112 used to encrypt the biometric information, e.g., the RBT. As one example, function encryption unit 124 may use public key 112 to encrypt a list of coordinates and orientations, e.g., $(X_1,Y_1,O_1), (X_2,Y_2,O_2), \ldots (X_n,Y_n,O_n)$, for each respective minutia point.

Computation engine 122 may authenticate the user using subsequent biometric information of the user and the helper data (310). For example, computation engine 122 uses the helper data generated during initial enrollment together with the subsequent biometric information to reconstruct a digital key that is used to authenticate the user.

In the absence of a security breach or update ("NO" branch of step 312), computation engine 122 continues to use the helper data generated during initial enrollment together with the subsequent biometric information to reconstruct a digital key that is used to authenticate the user.

In the event of a security breach or update ("YES" branch of step 312), computation engine 122 performs a re-enrollment of the biometric information by at least one of 1) retrieving the pre-generated function key from a memory, or 2) retrieving a dynamically generated function key from the one or more storage nodes that can be inaccessible during user authentication, e.g., storage nodes 110B (314). For example, computing device 120 may use the storage interface to automatically reconfigure connectivity for storage nodes 110B as online when performing re-enrollment. As one example, the one or more storage nodes 110B may be configured as accessible and/or physically attached to physical computing device 120 only during re-enrollment. Instead of receiving additional or repeat biometric information of a user, computation engine 122, via functional encryption unit 124, may retrieve function key 116 from the one or more storage nodes 110B. In some examples, function key 116 is a pre-generated function key from a memory or from the one or more storage nodes 110B. In some examples, function key 116 is dynamically generated during re-enrollment using master secret key 116. For example, computation engine 122, via functional encryption engine 124, may compute function key 118 during re-enrollment according to public parameters 112, master secret key 116, and a description of a cryptographic function, e.g., the Generate function of a fuzzy extractor algorithm.

Computation engine 122, via functional encryption engine 124, may apply, using the function key 116 and the functional encryption biometric information 114, a decryption operation to generate new helper data for subsequent authentication of the user (316). For example, functional encryption engine 124 may apply a decryption operation having as input public key 112, function key 118, and functionally encrypted biometric information 114 to generate new helper data. In some examples, the new helper data is generated as an evaluation of a cryptographic function during the decryption operation without the need to decrypt the biometric information. That is, the result of the decryption operation of the functionally encrypted biometric information 114 and function key 118 may be the output of an evaluation of the Generate function of the fuzzy extractor algorithm on the functionally encrypted biometric information 114.

Computation engine 122 may then authenticate the user using subsequent biometric information and the new helper data (318). For example, computation engine 122 may use the new helper data with a subsequent biometric sample (e.g., a noisy version of the biometric sample) to reconstruct a digital key or identifier that provides access or privileges for the authenticated user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A method comprising:
generating, by one or more computation engines of a biometric authentication system and according to biometric information of a user, helper data for authenticating the user;
generating a master secret key and a public key, the public key stored in one or more storage nodes that are accessible during user authentication;
applying functional encryption using the public key to the biometric information to produce functionally encrypted biometric information, wherein the functional encryption is based on an encryption function that encodes the biometric information; and
performing, by the one or more computation engines, re-enrollment by:
at least one of 1) retrieving a pre-generated function key from a memory, or 2) retrieving a dynamically generated function key from the one or more storage nodes that can be inaccessible during user authentication, the function key dynamically generated using the master secret key and a description of a cryptographic function used to produce the functionally encrypted biometric information, and
applying, using the function key and the functionally encrypted biometric information, a decryption operation to generate new helper data for subsequent authentication of the user, wherein the new helper data is generated as an evaluation of the cryptographic function during the decryption operation without the need to decrypt the biometric information,
wherein the re-enrollment occurs without receiving additional or repeat biometric information of the user and thereby results in faster re-enrollment.

2. The method of claim 1, further comprising:
configuring, by the computation engine, connectivity for the one or more storage nodes that are typically offline in order to store the functionally encrypted biometric information;
automatically reconfiguring, by the computation engine, connectivity for the one or more storage nodes as online when performing re-enrollment;
in response to the one or more storage nodes becoming online, retrieving the functionally encrypted biometric information and the function key from the one or more storage nodes only in response to performing re-enrollment; and
in response to retrieving the functionally encrypted biometric information and the function key from the one or more storage nodes, configuring, by the computation engine, the one or more storage nodes as offline.

3. The method of claim 1, wherein the cryptographic function comprises a generate function of a fuzzy extractor algorithm used to encode the biometric information.

4. The method of claim 3, wherein the generate function of the fuzzy extractor algorithm becomes deterministic by:
receiving a random value; and
parametrizing the generate function according to the random value.

5. The method of claim 4,
wherein the function key is generated according to a master secret key and a description of the generate function of the fuzzy extractor algorithm.

6. The method of claim 1, further comprising:
storing, by the computation engine, the functionally encrypted biometric information in the one or more storage nodes that are accessible during user authentication.

7. The method of claim 1, further comprising:
storing, by the computation engine, the functionally encrypted biometric information in the one or more storage nodes that are inaccessible during user authentication.

8. A computation device of a biometric authentication system comprising:

a functional encryption unit implemented in circuitry and configured to:
generate a master secret key and a public key;
apply functional encryption using the public key to biometric information to produce functionally encrypted biometric information, wherein the functional encryption is based on an encryption function that encodes the biometric information;
a storage interface implemented in circuitry and configured to:
interface with one or more storage nodes for storing the public key in one or more storage nodes that are accessible during user authentication; one or more computation engines implemented in circuitry and configured to:
generate helper data for authenticating the user according to biometric information of the user;
perform re-enrollment, wherein, to perform re-enrollment, the functional encryption unit is configured to:
at least one of 1) retrieve a pre-generated function key from a memory, or 2) retrieve a dynamically generated function key from the one or more storage nodes that can be inaccessible during user authentication, the function key dynamically generated using the master secret key and a description of a cryptographic function used to produce the functionally encrypted biometric information, and
apply, using the function key and the functionally encrypted biometric information, a decryption operation to generate new helper data for subsequent authentication of the user, wherein the new helper data is generated as an evaluation of the cryptographic function during the decryption operation without the need to decrypt the biometric information,
wherein the re-enrollment occurs without receiving additional or repeat biometric information of the user and thereby results in faster re-enrollment.

9. The computation device of claim 8, wherein the computing engine is further configured to:
configure connectivity for the one or more storage nodes that are typically offline in order to store the functionally encrypted biometric information;
automatically reconfigure connectivity for the one or more storage nodes as online when performing re-enrollment;
in response to the one or more storage nodes becoming online, retrieve the functionally encrypted biometric information and the function key from the one or more storage nodes only in response to performing re-enrollment; and
in response to retrieving the functionally encrypted biometric information and the function key from the one or more storage nodes, configure the one or more storage nodes as offline.

10. The computation device of claim 8, wherein the cryptographic function comprises a generate function of a fuzzy extractor algorithm used to encode the biometric information.

11. The computing device of claim 10, wherein, the generate function of the fuzzy extractor algorithm becomes deterministic by:
receiving a random value; and
parameterizing the generate function according to the random value.

12. The computing device of claim 11, wherein, to generate the function key, the computation engine is configured to:
generate the function key according to the master secret key and a description of the generate function of the fuzzy extractor algorithm.

13. The computing device of claim 8, wherein the storage interface implemented in circuitry and configured to:
interface with one or more storage nodes for storing the functionally encrypted biometric information in the one or more storage nodes that are accessible during user authentication.

14. The computing device of claim 8, wherein the storage interface implemented in circuitry and further configured to:
interface with one or more storage nodes for storing the functionally encrypted biometric information in the one or more storage nodes that are inaccessible during user authentication.

15. A computer-readable storage medium of a biometric authentication system having stored thereon instructions that, when executed, cause a processor to:
generate helper data for authenticating a user according to biometric information of the user;
generate a master secret key and a public key, the public key stored in one or more storage nodes that are accessible during user authentication;
apply functional encryption using the public key to the biometric information to produce functionally encrypted biometric information, wherein the functional encryption is based on an encryption function that encodes the biometric information; and
perform re-enrollment, wherein, to perform re-enrollment, the functional encryption unit is configured to:
at least one of 1) retrieve a pre-generated function key from a memory, or 2) retrieving a dynamically generated function key from the one or more storage nodes that can be inaccessible during user authentication, the function key dynamically generated using the master secret key and a description of a cryptographic function used to produce the functionally encrypted biometric information, and apply, using the function key and the functionally encrypted biometric information, a decryption operation to generate new helper data for subsequent authentication of the user, wherein the new helper data is generated as an evaluation of the cryptographic function during the decryption operation without the need to decrypt the biometric information,
wherein the re-enrollment occurs without receiving additional or repeat biometric information of the user and thereby results in faster re-enrollment.

16. The computer-readable storage medium of claim 15, wherein the instructions further comprise instructions that, when executed, cause a processor to:
configure connectivity for the one or more storage nodes that are typically offline in order to store the functionally encrypted biometric information;
automatically reconfigure connectivity for the one or more storage nodes as online when performing re-enrollment;
in response to the one or more storage nodes becoming online, retrieve the functionally encrypted biometric information and the function key from the one or more storage nodes only in response to performing re-enrollment; and
in response to retrieving the functionally encrypted biometric information and the function key from the one or more storage nodes, configure the one or more storage nodes as offline.

17. The computer-readable storage medium of claim 15, wherein the cryptographic function comprises a generate function of a fuzzy extractor algorithm used to encode the biometric information.

18. The computer-readable storage medium of claim 17, wherein, to generate the function key, the instructions further comprise instructions that, when executed, cause a processor to:
  generate the function key according to the master secret key and a description of the generate function of the fuzzy extractor algorithm.

19. The computer-readable storage medium of claim 15, wherein the instructions further comprise instructions that, when executed, cause a processor to:
  store the functionally encrypted biometric information in the one or more storage nodes that are accessible during user authentication.

20. The computer-readable storage medium of claim 15, wherein the instructions further comprise instructions that, when executed, cause a processor to:
  store the functionally encrypted biometric information in the one or more storage nodes that are inaccessible during user authentication.

* * * * *